United States Patent [19]

Otsuka et al.

[11] 4,338,102

[45] Jul. 6, 1982

[54] DEVICE FOR REMOVING RADIOACTIVE PARTICLES IN MOIST GAS

[75] Inventors: Katsuyuki Otsuka, Mito; Hiroaki Miyo, Katsuta, both of Japan

[73] Assignee: Doryokuro Kakunenryo Kahatsu Jigyodan, Tokyo, Japan

[21] Appl. No.: 215,036

[22] Filed: Dec. 10, 1980

[30] Foreign Application Priority Data

Dec. 27, 1979 [JP] Japan ............................... 54-171626

[51] Int. Cl.[3] ...................... B01D 19/00; B01D 23/24; B01D 35/18

[52] U.S. Cl. ........................................ 55/185; 34/4; 55/208; 55/301; 55/385 F; 55/DIG. 9

[58] Field of Search ................ 55/185, 208, 282, 301, 55/385 F, DIG. 9, DIG. 10, DIG. 32, 277; 34/4

[56] References Cited

U.S. PATENT DOCUMENTS

| | | | |
|---|---|---|---|
| 3,922,974 | 12/1975 | Hempelmann | 55/282 X |
| 3,937,015 | 2/1976 | Akado et al. | 55/282 X |
| 4,103,431 | 8/1978 | Levinson | 34/4 |
| 4,126,945 | 11/1978 | Manser et al. | 34/4 |

FOREIGN PATENT DOCUMENTS

| | | | |
|---|---|---|---|
| 341751 | 1/1931 | United Kingdom | 55/301 |
| 1424431 | 2/1976 | United Kingdom | 34/4 |

*Primary Examiner*—Kathleen J. Prunner

*Attorney, Agent, or Firm*—Wenderoth, Lind & Ponack

[57] ABSTRACT

An improved device for effectively removing radioactive particles in moist gas has a pipe for feeding therethrough a moist gas containing radioactive solid particles, a solid-gas separation filter disposed in the pipe, a microwave generator and a wave guide connected between the pipe and the generator. Within the wave guide there is disposed a shielding plate capable of passing the microwave therethrough and preventing the spreading of contamination. Microwave from the generator is applied to the filter by means of the wave guide, and moisture condensate and the like on the filter is heated and evaporated by the microwave to minimize clogging of the filter.

4 Claims, 2 Drawing Figures

DEVICE FOR REMOVING RADIOACTIVE PARTICLES IN MOIST GAS

BACKGROUND OF THE INVENTION

The present invention relates to a device for removing radioactive solid particles from moistened gas and, more particularly, to a decontamination device including a filter, which device is suitable for use in the waste gas treating system of equipments for heat treatment such as drying, evaporation or the like of solution, sludges and solid matters containing radioactive substances.

Moistened gas containing radioactive solid particles is generated in the treatment of such as drying, evaporation, distillation or the like of substances containing solution, e.g. direct denitration and treatment of analytical waste liquid. In order to treat such waste gas, various methods have been used heretofore, such as scrubbing of the gas with a solution, condensation of the gas followed by re-evaporation. These conventional treating methods, however, require largescale equipment having a multiplicity of constituents. These conventional equipments require impractically large installation area when placed in a glove box for treating the radioactive substance and are difficult to handle.

It has been proposed to use a filter for removing the radioactive particles. This, however, is not preferred because the filter is soon clogged and becomes inoperative particularly when the treated gas is a moistened gas.

SUMMARY OF THE INVENTION

An object of the present invention is to provide an improved device for removing radioactive solid particles in moist gas.

Another object of the present invention is to provide the device concerned which can be installed in a glove box.

A further object of the present invention is to provide the device concerned which can be operated without substantial labor or difficulty.

Another object of the present invention is to provide the device concerned which ensures to filtrate radioactive substances to minimize clogging in a filter element.

According to the invention, a solid-gas separation filter is basically used for separating and removing radioactive particles from the moistened gas. With the knowledge that the clogging of the filter in the conventional system is mainly attributable to the condensation of moisture on the filter, according to the invention, microwave is applied to the filter to heat up the latter to evaporate and dry the moisture condensate thereby to prevent the filter from being clogged to ensure a continuous good filtration performance of the filter.

Briefly, the inventive device comprises a pipe for feeding therethrough a moist gas containing radioactive solid particles, a solid-gas separation filter disposed in the pipe, a microwave generator, a wave guide connected between the pipe and the generator so as to apply the microwave to the filter, and a shielding plate in the wave guide. The shielding plate is made of material capable of passing the microwave therethrough and preventing the spreading of contamination.

The invention will be more fully understood from the following description taken in conjunction with the accompanying drawings.

DETAILED DESCRIPTION OF THE INVENTION

Figure 1:
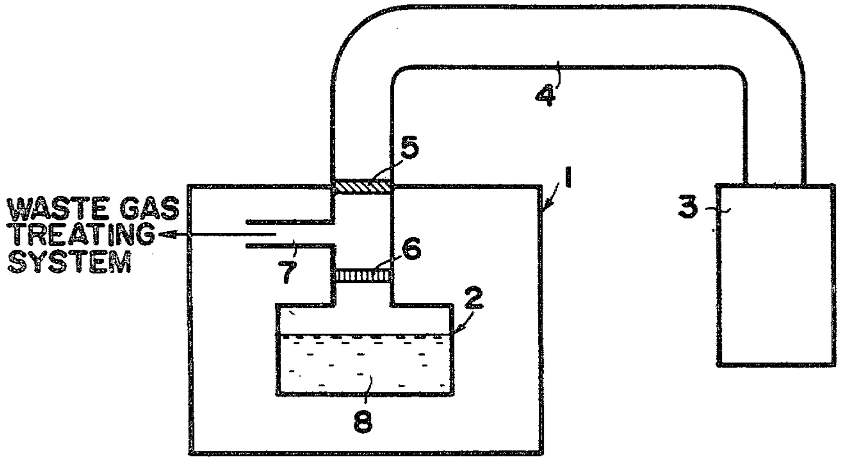
FIG. 1 is a schematic view of a device for removing radioactive particles in moist gas according to an embodiment of the present invention.

Referring first to FIG. 1 illustrating an embodiment of the invention, an evaporator 2 disposed inside a glove box 1 and a microwave generator 3 disposed outside the glove box 1 are interconnected through a wave guide pipe 4 in which is disposed a shielding plate 5 for preventing the spreading of contamination. The shielding plate 5 is made of a material having a good microwave guiding nature and a high corrosion resistance, e.g. fluorine-containing resin, silicone resin, glass, ceramics and so forth, and is adapted to prevent radioactive substances from being diffused into the microwave generator 3, although it permits the electromagnetic wave coming from the generator 3 to pass therethrough. A filter 6 is interposed between the evaporator 2 and the shielding plate 5. The filter 6 used in this device is an HEPA filter (High Efficiency Particulate Air Filter, having performance defined in Japan Industrial Standard (JIS) Z 4812-1975) made of a material capable of passing microwave therethrough, such as, for example, asbestos containing glass. A waste gas pipe 7 is connected between the filter 6 and the shielding plate 5 and leads to a waste gas treating system (not shown).

The evaporator 2 is charged with a solution, sludge, solid matters or the like material 8 to be heated to generate a moist gas containing radioactive particles, and the microwave generator 3 is operated. The microwave having a frequency of, for examples, 915 MHz or 2450 MHz, is applied to the material 8 in the evaporator 2 through the shielding plate 5 and the filter 6. In consequence, the material 8 is evaporated to generate a moist gas which is sent through the filter 6 to the waste gas pipe 7. Namely, the portion of the wave guide pipe 4 in the vicinity of the filter 6 and extending from the evaporator 2 to the waste gas pipe 7, serves also as a gas pipe. The condensate or the like on the filter 6, which constitutes a main cause of the clogging, is heated and evaporated by the microwave so that the clogging is avoided conveniently. It is possible to employ a plurality of filteration stages in accordance with the extent of contamination of the waste gas.

The embodiment of the invention as shown in FIG. 1 offers a great advantage that the construction of the device as a whole is very much simplified because the heating of the filter 6 and the heating of the material 8 in the evaporator 2 can be made simultaneously by the single microwave generator 3.

Figure 2:
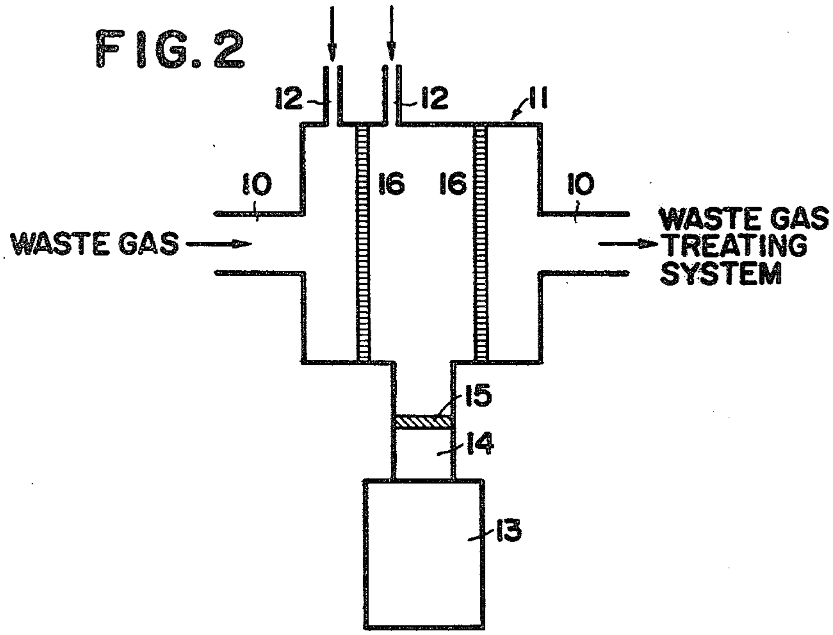
FIG. 2 is a schematic view of a device for removing radioactive particles in moist gas according to another embodiment of the present invention.

Another embodiment of the invention as shown in FIG. 2 is suitable for use in such an equipment that the source of the moistened gas (waste gas) containing radioactive solid particles is located at a place remote from the waste gas treating system. In FIG. 2, an oven or furnace 11 is disposed at an intermediate portion of a gas pipe 10 interconnecting a waste gas generator (not shown) and a waste gas treating system (not shown). At least one filter 16 which is the same as the aforementioned HEPA filter 6 in FIG. 1 is disposed within the oven 11. The oven 11 is connected to a microwave generator 13 through a wave guide pipe 14 in which mounted is a shielding plate 15 for preventing the diffusion of the contamination.

In the embodiment of FIG. 2, two filters 16, 16 may be used with one being disposed at the waste gas inlet side and the other at the waste gas outlet side, respectively, within the oven 11, and the wave guide 14 is connected to the oven 11 at the position between the two filters 16, 16.

The condensate or the like on the HEPA filter 16 is heated and evaporated by the microwave, so that the undesirable clogging of the filter is avoided. Supply of an additional air, if necessary, can be made through air supply pipes 12. If necessary, the HEPA filter may be made of a material having also a high resistance to chemicals, such as, for example, asbestos containing relatively much glass.

As will be seen from the foregoing description, the device of the invention having the described construction can effectively remove, by means of a filter, radioactive solid particles from moistened gas in which the particles are suspended. Therefore, the apparatus and equipments can have simplified construction and reduced size suitable for installation in a glove box. In addition, the device of the invention is easy to handle and maintain.

Though the present invention has been described with reference to the preferred embodiments, many modifications and alterations can be made within the spirit of the invention.

What is claimed is:

1. A device for removing radioactive particles from moist gas comprising a pipe means for feeding the moist gas containing radioactive solid particles to a waste gas treating system, at least one solid-gas separation filter means disposed in said pipe means, said moist gas flowing through said filter means to separate the radioactive particles from the gas, a microwave generator, a wave guide connected between said pipe means and said microwave generator so as to apply microwave from the generator to the filter means to evaporate moisture condensate on the filter, and a shielding member disposed in said wave guide, said shielding member being made of a material capable of passing the microwave therethrough and preventing the spreading of contamination, whereby the filter means is prevented from being clogged by the moisture condensate.

2. The device according to claim 1, in which a furnace is disposed at an intermediate portion of said pipe means, said solid-gas separation filter means being disposed within said furnace, said wave guide being connected to said furnace so as to apply the microwave to the filter means in the furnace.

3. The device according to claim 1, in which said solid-gas separation filter means is made of a material capable of passing microwave therethrough.

4. The device according to claim 3, in which the device further comprises an evaporator from which a moist gas containing radioactive particles is generated, said evaporator being connected to said pipe means through the solid-gas separation filter means, said wave guide being extended from said microwave generator to the pipe means so as to apply the microwave to a substance contained in the evaporator through the filter means, whereby heating of the substance in the evaporator and heating of the filter means are carried out simultaneously by microwave generated from the single microwave generator.

* * * * *

UNITED STATES PATENT AND TRADEMARK OFFICE
CERTIFICATE OF CORRECTION

PATENT NO. : 4,338,102

DATED : July 6, 1982

INVENTOR(S) : Katsuyuki Ohtsuka, Hiroaki Miyo

It is certified that error appears in the above—identified patent and that said Letters Patent is hereby corrected as shown below:

In the heading: line 75, for "Otsuka" read --Ohtsuka--;

line 73, for "Kahatsu" read --Kaihatsu--.

Signed and Sealed this

*Twenty-second* Day of *May 1984*

[SEAL]

*Attest:*

GERALD J. MOSSINGHOFF

*Attesting Officer* *Commissioner of Patents and Trademarks*